United States Patent

Reinhall

[11] 3,987,973
[45] Oct. 26, 1976

[54] DEVICE IN MACHINE ELEMENTS WITH CLOSED CASING

[76] Inventor: Rolf Bertil Reinhall, 834 171st. Place, NE., Bellevue, Wash. 98008

[22] Filed: Mar. 6, 1975

[21] Appl. No.: 556,146

[30] Foreign Application Priority Data
Mar. 11, 1974 Sweden............................. 7403203

[52] U.S. Cl.............................. 241/259.2; 241/244; 277/14 R
[51] Int. Cl.²......................................... B02C 7/16
[58] Field of Search......................... 241/244, 259.2; 277/14 R, 25

[56] References Cited
UNITED STATES PATENTS

| 822,802 | 6/1906 | Wilkinson | 277/14 |
| 2,461,655 | 2/1949 | Noble | 277/14 |
| 3,091,469 | 5/1963 | Matt | 277/14 UX |
| 3,212,721 | 10/1965 | Asplund et al. | 241/259.2 X |
| 3,256,027 | 6/1966 | Chapel | 277/25 |
| 3,717,308 | 2/1973 | Reinhall | 241/259.2 X |

FOREIGN PATENTS OR APPLICATIONS

| 254,377 | 5/1963 | Australia | 277/25 |
| 593,255 | 10/1947 | United Kingdom | 277/25 |

Primary Examiner—Granville Y. Custer, Jr.
Assistant Examiner—Howard N. Goldberg
Attorney, Agent, or Firm—Eric Y. Munson

[57] ABSTRACT

The invention relates to a device for sealing a casing housing a machine element the rotatable shaft of which passes through the casing within which a pressure differing from that of the outside the casing is maintained. To provide a perfect sealing at the shaft passage, a liquid seal is formed by novel specific means. In a preferred embodiment where the device is combined with an apparatus the shaft of which passing through at least one wall of the casing is axially displaceable, the specific sealing means are displaceable together with the shaft while completely maintaining the sealing effect.

3 Claims, 1 Drawing Figure

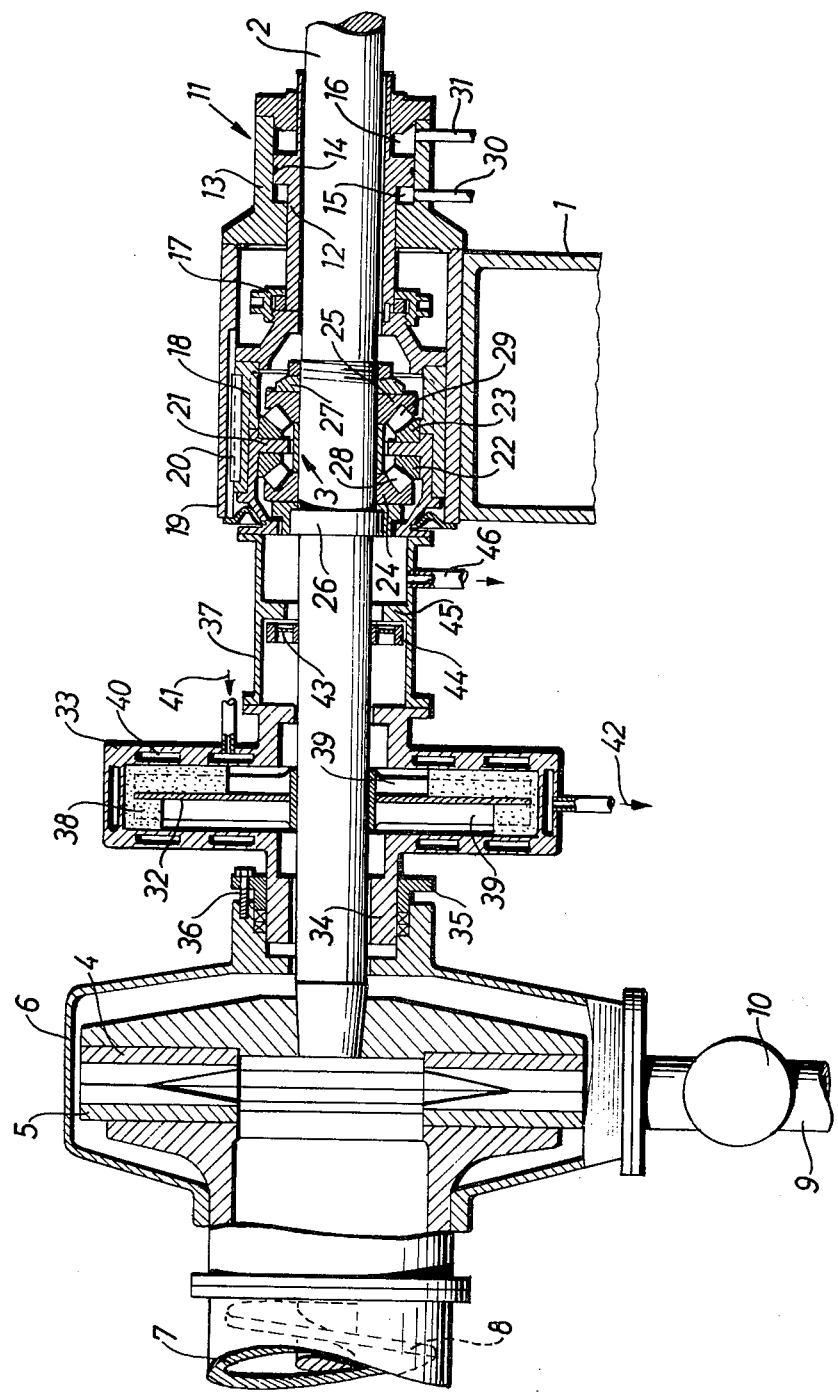

DEVICE IN MACHINE ELEMENTS WITH CLOSED CASING

FIELD OF THE INVENTION

This invention relates to a device in machine elements with closed casing.

More particularly this invention relates to a device in machine elements with closed casing within which prevails a pressure deviating from that of the surroundings and which is passed by a rotatable shaft, the interior of said casing being sealed from the surroundings by means of a rotating liquid seal adapted to cooperate with said shaft. The pressure inside the casing differing from that of the surroundings may be overpressure or partial vacuum.

THE PRIOR ART

The problem of sealing or tightening shaft passages through closed casings by means of conventional sealing constructions of the stuffing box type has been attacked in many different ways. However, all solutions have almost without exception had the common feature that the sealing effect is brought about by providing various stuffing materials, elastic ones or non-elastic ones, in/or adjacent the shaft passageway and forcing said materials by varying devices against the surface of a rotating shaft or against sealing surfaces provided on the shaft. The clearances between the cooperating sealing surfaces are very small, and by friction caused thereby heat is generated in varying amounts, which heat must be carried off from the sealing device to avoid that the same be destroyed. Naturally, this generation of heat becomes the higher, the higher are the number of revolutions and the circumferential speed of the shaft. With high speeds difficulties arise how steadily and uniformly to lead away the heat generated by friction in the sealing device, for which reason excess heating with subsequent destruction of the stuffing materials or mechanical components included therein may happen rather often. Thus, with very high circumferential speeds the heat removal problem often becomes very critical and in addition difficult to solve. For this reason, known sealing devices, which have been used for these high circumferential speeds, have resulted in abnormally high costs of maintenance and furthermore a time-wasting survey. The difficulties are accentuated further in so-called dry stuffing boxes, where oil or cooling agent can be supplied directly to the stuffing surfaces.

OBJECTS AND MAIN FEATURES OF THE INVENTION

One main object of the invention is to overcome said drawbacks by providing an improved sealing device for machine elements with closed casing passed by a rotating shaft.

The present invention starts from the known technique with a rotating liquid seal. According to a main feature of the invention the novel device is substantially characterized in that the liquid seal comprises a disc rigidly secured onto the shaft and surrounded by an annular, inwards open, rotationally stationary sealing case, said case containing a liquid adapted on and during rotation of the shaft to be carried along by the disc and formed into a liquid ring.

In a device of the stated type, it has proved to be especially important that the position of the disc in the case is not changed in axial direction when the shaft is displaced in one or the other direction. Thus, another important object of the invention is to eliminate the possibility of displacement of the disc relative the case, the latter is coupled together with the shaft in some suitable manner, sealing or tightening means permitting this follow displacement being provided between the machine element casing and said sealing case.

SHORT DESCRIPTION OF THE DRAWING

Further objects and advantages of the invention will become apparent from the following detailed description of a preferred embodiment with reference to the attached drawing, which forms part of this specification and which illustrate the novel sealing device combined with a grinding apparatus known per se. Only the parts of the apparatus essential in this connection are shown in the drawing. The grinding apparatus may be a defibrator or a refiner, preferably for treating lignocellulose-containing material.

DETAILED DESCRIPTION OF A PREFERRED EMBODIMENT

In the accompanying drawing, reference numeral 1 denotes part of the base frame of the grinding apparatus, in which a shaft 2 is mounted in bearings. As bearing elements for the shaft 2 double combined radial and axial thrust bearings are employed, and one such bearing 3 is shown in the drawing. The shaft 2 is at its one end adapted to be coupled to a driving motor (not shown). At its opposite end the shaft 2 carries a grinding disc 4 rigidly secured thereto and is together with the same axially adjustable relatively to a second, stationary grinding disc 5. The two grinding discs 4, 5 are encased by a grinding casing 6, and the material to be ground is introduced through a central axial channel 7. The material to be ground is advanced through the channel and carried outwards by means of a feed screw 8 between treated grinding surfaces formed on the surfaces facing one another of the grinding discs 4, 5 to be treated in a manner known per se. After treatment of the material to be ground between the grinding discs 4, 5, the ground produce is discharged through a discharge duct 9 equipped with a control valve 10.

Mounted concentrically with, and around, the shaft 2 is a servomotor 11. The same consists of a cylindrically shaped piston 12, which is axially displaceable. The piston 12 is, however, not rotatable within its stationary piston housing 13. The piston 12 has a flange 14, which subdivides a cylindrical space formed in the piston housing 13 into two chambers 15, 16, separated from one another.

By means of a coupling 17 the piston 12 is rigidly secured to the housing 18 of the bearing 3, said housing in turn being axially slidable within a stationary external casing 19 supported by the base frame 1, but prevented from rotating relatively to this latter by means of a spline 20 or some other adequate coupling means.

Mounted in the bearing housing 18 is a central bearing element 21 housing two non-rotating bearing rings 22, 23. Fixed onto the shaft 2 are two additional bearing rings 24, 25 which rotate together with the shaft 2, but are axially fixed on said shaft between a flange 26 and a screw cap 27. The bearing rings are formed with rollerways facing, and inclined relatively to, one another and intended for cooperation with rollers 28, 29. It will be easily understood, that the bearing 3 is capable to transfer axial pressure in both directions and also to absorb radial load from the shaft 2.

A hydraulic pressure fluid such as oil can be fed into the chambers 15, 16, respectively, in the servomotor 11 through associated pipes 30, 31, respectively, in a manner known per se.

The novel sealing device is mounted between the grinding casing 6 and the bearing housing 18. The liquid seal mainly consists of a disc 32 surrounded by an annular and inwards open, rotationally stationary sealing case 33. A flange portion 34 of the sealing case 33 facing the grinding casing 6 is sealed against this latter by means of a sliding gasket 35 in such a manner known per se that the sealing case 33 can be displaced axially relatively to said grinding casing 6. In this connection an adjustabble bolt joint 36 is utilized for mounting a stuffing box between the sealing case 33 and the grinding casing 6. The part of the sealing case 33 facing the double radial and axial thrust bearing 3 is by means of an extension unit 37 rigidly secured to the bearing housing 18. For the securing together of said parts bolt joints (not shown) may be used.

When pressure fluid is fed into the chamber 16, the piston 12 will be displaced to the left in the figure and therewith the rotating grinding disc 4 in a direction towards the stationary grinding disc 5. Then the chamber 15 is free from pressure. By adjustment of a valve (not shown), pressure fluid can instead be fed into the chamber 15, whereas the chamber 16 is connected with an oil sump (not shown). As a result, the grinding disc 4 is advanced in a direction away from the grinding disc 5. Servomotors of this type are known from the U.S. Pat. No. 2,964,250, for example. It should be observed that both the sealing case 33 and the disc 32 positioned therein as well as the extension unit 37 are carried along with the displacement of the shaft 2 in one or the other direction. Thus, due to the fact that the sealing case 33 is rigidly secured onto the bearing housing 18, the disc 32 located in the sealing case 33 will always take the same position inside the sealing case, which results in that the equivalence in the sealing case 33 never will be disturbed.

The sealing case 33 contains a suitable sealing liquid 38, such as water or mercury, for example. When the shaft 2 does not rotate, the sealing liquid 38 is collected in the portion of the sealing case 33 situated below the shaft 2. The employed quantity of sealing liquid 38 is dependent on the conditions at hand in the individual case and determined beforehand. When and as long as the shaft 2 rotates with a speed at or over the predetermined value, also the disc 32 fixed thereon rotates and by action of the centrifugal force the sealing liquid 38 is forced outwards against and distributed along the peripherally located inner portions of the sealing case 33, thereby bringing about a sealing effect. In order to facilitate distribution and movement in outward direction of the sealing liquid 38 the disc 32 is on both surfaces formed with radially extending driver flanges 39. The inner surfaces of the sealing case 33 are carefully finished and polished in order to reduce the friction between said surfaces and the rotating sealing liquid 38 to a minimum value. Nevertheless, on rotation of the shaft some friction always will be produced between the sealing liquid 38 and the inner surfaces of the sealing case 33. By way of calculations it has been established that said friction normally will not cause any disturbing generation of heat. In order to render possible to maintain the temperature at a desirable low level, the sealing case 33 can be formed with cooling channels 40, through which a cooling agent can be passed. In the drawing, there is shown an inlet 41 and an outlet 42 for such cooling agent.

In the shown embodiment, the sealing device also includes a mechanically operated sealing or closing device which becomes operative as soon as the rotation of the shaft 2 falls below the predetermined speed which results in that the liquid 38 owing to the reduction of the action of the centrifugal force no longer will be capable of bringing about the intended sealing effect. The closing device includes a conventional sealing element, for instance a carbon sealing element, and it consists of a resilient driver member 43 fixed onto the shaft 2 and on its circumference carrying an excentrically mounted sealing ring 44, which, when the shaft 2 is at rest, bears against a flange 45 projecting inwards from the central part of the extension unit 37. The bearing effect is brought about by the driver member 43, which may be a disc made of some resilient material and having a conical or cup-like shape, the driver member 43 then preferably being shaped as a cup spring or Belleville spring washer. The concave side of the driver member 43 faces, and is, when the shaft is at rest, forced against, the flange 45 of the extension unit 37. By rotation of the shaft 2 a moment is produced in the driver disc 43, the sealing ring 44 then being bent off in a direction away from said flange 45, until its rotational center of gravity axially coincides with the place where the driver member 43 has been fixed onto the shaft 2.

The closing device becomes operative only when the rotational speed falls to or below the predetermined low value which by a setting operation can be adjusted to a desired number of revolutions. The weight of the sealing ring 44 and the diameter of the driver disc 43 are adapted in such a manner that the moment which is generated when the shaft 2 is started again, is sufficiently great to surmount that force also, with which the sealing ring 44 is forced against the flange 45. By an arrangement of this kind, the wear between the sealing ring 44 and the sealing flange 45 cooperating therewith is reduced to a minimum.

That part of the interior of the extension unit 37, which in the figure is located to the right of the said sealing flange 45, is formed with an aperture 46 which is utilized as an emergency steam outlet. This outlet becomes operative when too great overpressure should be produced in the grinding casing 6 on start and stop of the grinding apparatus.

Modifications of the device described above are possible within the scope of the invention. In this connection it should be observed especially that the device according to the invention by no means is bound to a grinding apparatus of the shown type. Thus, the sealing device, which is self-adjusting, could also be used in connection with other types of passageways for rotating shafts through a vessel standing under overpressure, or in connection with separating sealing arrangements of other kinds.

While one more or less specific embodiment of the invention has been shown and described, it is to be understood that this is for purpose of illustration only, and that the invention is not to be limited thereby but its scope is to be determined by the appended claims.

What is claimed is:

1. In a grinding apparatus of the defibrator or refiner type including a closed casing having a pressure therein differing from that of the ambient atmosphere, at least two grinding elements located within the casing, one of the grinding elements being stationarily mounted in the casing, the other grinding element being supported on a rotatable shaft passing through the casing, and the rotatable shaft having operatively associated therewith a servo motor operated displacement piston for axially displacing the shaft relative to the casing, the improvement of liquid seal means cooperating with the shaft for sealing the interior of the casing from the ambient atmosphere comprising:

a disc rigidly secured to the shaft, a stationary annular sealing housing surrounding the disc, the annular sealing housing being open inwardly to contain a sealing liquid which during rotation of the shaft is conveyed by the disc to form a liquid ring, the sealing housing being coupled to the casing, the sealing housing being joined to the displacement piston so that it is displaced along with the shaft displacement, and yieldable mechanical sealing means located between the casing and the sealing housing for yielding in correspondence to the housing displacement.

2. The improvement according to claim 1 in which the sealing housing surrounding the disc is provided with cooling channel means for passing a cooling medium therethrough.

3. The improvement according to claim 1 wherein mechanical sealing means are located between the shaft and the sealing housing in the area where the sealing housing is joined to the displacement piston, the mechanical sealing means including means for assuring that a seal is provided when the shaft is not rotated and means for releasing the seal when the shaft is rotated.

* * * * *